United States Patent [19]

Budrikis et al.

[11] Patent Number: 4,796,020
[45] Date of Patent: Jan. 3, 1989

[54] METHOD AND APPARATUS FOR DRAWING ANTIALIASED LINES AND POLYGONS

[75] Inventors: Zigmantas L. Budrikis, Nedlands, Australia; Arun N. Netravali, Westfield, N.J.

[73] Assignee: American Telephone and Telegraph Company, AT&T Bell Laboratories, Murray Hill, N.J.

[21] Appl. No.: 837,886

[22] Filed: Mar. 10, 1986

[51] Int. Cl.$^4$ .............................................. G09G 1/00
[52] U.S. Cl. .................................... 340/728; 340/723; 340/744; 340/747; 340/793
[58] Field of Search ............... 340/723, 728, 744, 747, 340/793

[56] References Cited

U.S. PATENT DOCUMENTS

| | | | |
|---|---|---|---|
| 4,237,457 | 12/1980 | Houldsworth | 340/728 |
| 4,262,290 | 4/1981 | Vallins | 340/728 |
| 4,591,843 | 5/1986 | Pratt | 340/728 |
| 4,591,897 | 5/1986 | Edelson | 340/728 |
| 4,612,540 | 9/1986 | Pratt | 340/728 |

OTHER PUBLICATIONS

K. Turkowski, "Anti-Aliasing Through the Use of Coordinate Transformations," *ACM Transactions on Graphics*, vol. 1, No. 3, Jul. 1982, pp. 215–234.
J. Barros et al., "Generating Smooth 2-D Monocolor Line Drawings on Video Displays," *Computer Graphics*, vol. 13, Aug. 1979, pp. 260–269.
J. T. Whitted, "Anti-Aliased Line Drawings Using Brush Extrusion," *ACM Transactions on Computer Graphics*, vol. 17, Jul. 1983, pp. 151–156.
A. Fujimoto et al., "Jag Free Images on a Raster CRT," *Computer Graphics, Theory and Applications*, 1983, pp. 2–15.

Primary Examiner—Gerald L. Brigance
Assistant Examiner—Jeffery A. Brier
Attorney, Agent, or Firm—Henry T. Brendzel

[57] ABSTRACT

A method and apparatus that employ precomputed line profiles to draw lines on a raster scan terminal with mostly horizontal or vertical "brush strokes" that develop the desired line profiles. The precomputed line profiles relate mostly to the slope of the drawn lines and to the position of the drawn lines between adjacent pixels on the raster scan terminal in the direction of the "brush strokes". A relatively small number of precomputed values is required, permitting the apparatus to operate at the low resolution of the raster scan and be driven advantageously by a look-up table. This results in a very fast operation of the system while leading to pleasing results. The method also takes into account corners and end-of-line conditions to avoid very abrupt and unnatural looking end points.

13 Claims, 3 Drawing Sheets

METHOD AND APPARATUS FOR DRAWING ANTIALIASED LINES AND POLYGONS

BACKGROUND OF THE INVENTION

This relates to graphics displays and, more particularly, to displays of computer graphics on raster video terminals.

In recent years, decreasing memory costs have resulted in the increased use of raster scan displays in computer graphics applications. Raster scanning is particularly well suited for presentation of continuous tone and color images, and perhaps for that reason it also is the display mode used by essentially all computer terminals. Raster type terminals, however, have inherent spatial resolution constraints because the image is constructed from spaced horizontal scans and regularly spaced picture elements (pixels) in each scan. Bandwidth limitations and hardware cost considerations drive the art and, therefore, most raster display systems offer the lowest spatial resolution that is acceptable to the target group. To further reduce cost, some graphics systems reduce the intensity resolution by employing a single bit to deine the intensity of each pixel. Use of a single bit per pixel, of course, permits the use of a smaller frame buffer memory. The spatial resolution limitations of raster scans, coupled with single bit per pixel buffers, generally result in poor image qualtiy which manifests itself in staircase-like patterns in lines that are other than perpendicular or horizontal. A number of artisans have been trying to overcome this aliasing phenomenon.

Akira Fujimoto and Kansei Iwata describe one approach in "Jag Free Images on a Raster CRT", Computer Graphics Theory and Applications, Proceedings of Inter Graphics, 1983, pp. 2–15. They compute an intensity for each pixel in proximity to a drawn line based on a Fourier window calculation. The calculations create a line profile having the shape of an equilateral triangle centered on the drawn line. The intensity computed for each pixel is based on the proximity of the pixel to the line and on the slope of the line.

J. T. Whitted, in "Anti-Aliased Line Drawings Using Brush Extrusion", *ACM Transactions on Computer Graphics*, Vol. 17, July 1983, pp. 151–156, describes a number of other approaches employed in the art. He employs a brush painting approach in combination with super sampling. More specifically, Whitted employs a virtual canvas of 4096 by 4096 pixels and a small pixel array which serves as the brush. The brush is "dragged" across the canvas at the 4096 by 4096 resolution, but the line is displayed at 512 by 512 resolution. Aliasing is avoided by drawing at high resolution and effectively filtering before resampling at the low resolution. Whitted's system works well but requires large amounts of storage.

It is an object of our invention to draw lines on a raster type terminal without creating the aforementioned aliasing phenomenon. It is another object of our invention to provide a method that is simple and fast enough to permit drawing lines in real time. It is still another object of our invention to blend drawn lines in the image background.

SUMMARY OF THE INVENTION

These and other objects of our invention are realized with a method that employs precomputed line profiles to draw lines with mostly horizontal or vertical "brush strokes" that develop the desired line profiles. The use of mostly horizontal or vertical lines reduces the problem to a one dimension problem, as compared to a two dimension problem, and speeds the process considerably. The precomputed line profiles relate mostly to the slope of the drawn lines and to the position of the drawn lines between adjacent pixels in the direction of the "brush strokes". In accordance with our method, a relatively small number of precomputed values is required and, therefore, the apparatus implementing our invention is advantageously driven by a look-up table. This results in a very fast operation of the system at the low resolution, yet leads to pleasing results. Our method also takes into account corners and end-of-line conditions to avoid very abrupt and unnatural looking end points.

A clearer understanding of our invention may be had by perusing through the following detailed description and studying the drawings where:

DETAILED DESCRIPTION

Our algoithm starts with a description of the line to be drawn over a background image. The line may be specified by an equation of the curve to be drawn or it may be obtained from a graphic input device such as a light pen or a "mouse." In the latter case, discrete points specified by the graphic input device are joined by suitable interpolation scheme (e.g., splines). In accordance with the principles of our invention, lines can also have various thicknesses, again specified either by an equation, or by an input device such as a light pen having means for translating applied pressure to a thickness specification.

Figure 1:
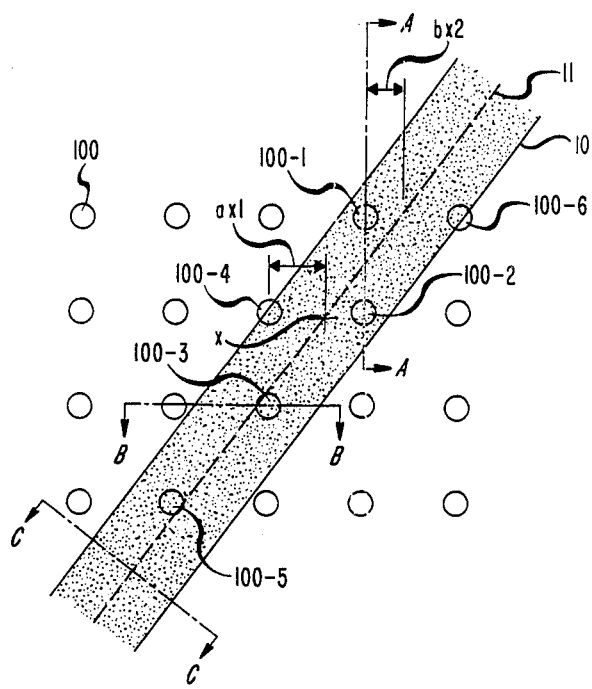
FIG. 1 depicts a line segment on a raster scan having a rectangular array of pixels.

FIG. 1 is an enlarged illustration of a screen segment with a plurality of equally spaced pixels 100 and a diagonal line 10 having a centerline 11. When line 10 is specified by an equation or by a mathematically generated line as part of an interpolation between two points, it is centerline 11 that is actually specified. An optional second parameter may be used to specify the desired line thickness of line 10. When line 10 is generated by a light pen that permits a thickness specification, e.g., by means of applied pressure, or by a light pen that has a broad "footprint," then it is the light pen that determines the thickness of line 10.

Figure 2:
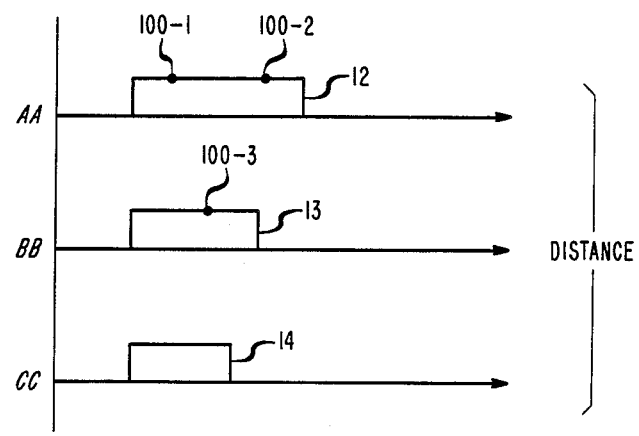
FIG. 2 show various line profiles of the line depicted in FIG. 1.

A line profile, in the context of this disclosure, is the curve that smoothly describes the light intensity of the line at any one point along a cut in the line. This concept is akin to the concept of cross section views of three dimensional objects. Naturally, a profile changes in accordance with the direction of the cut, and it is readily seen that a line profile is narrowest when the cut is perpendicular to the line. It is also readily apparent that a line can be described by, or constructed with, a plurality of closedly spaced horizontal cuts or vertical cuts. In FIG. 2, for example, curve 12 depicts the profile of line 10 along the vertical cut AA and curve 13 depicts the profile of line 10 along horizontal cut BB. Both are wider than curve 14 that depicts the profile along cut CC which is perpendicular to line 10.

The profiles of FIG. 2 are drawn box-like to faithfully reproduce the depiction of line 10 in FIG. 1. In reality, line 10 does not have absolutely sharp edges, and the profiles of FIG. 2 would be more representative of the true line profile if the edges were sloped and rounded off. Viewing this issue from a different perspective, all physical systems have bandwidth limitations, and this bandwisth limitation can always be expressed in terms of a low pass filtering action, or function. Thus, a profile for line 10 would be more representative of a physically realizable line by passing the shapes of FIG. 2 through an appropriate low pass filter.

Another aspect of the FIG. 2 profiles relates to the width of line 10. As drawn, line 10 subsumes pixels 100-1, 100-2, 100-3 and 100-5, and a portion of pixels 100-4 and 100-6. In actual raster displays, however, the distance between pixels, as compared to their diameter is much smaller than shown in FIG. 1, which results in many more pixels being either partially or completely subsumed in any one line profile (two being the largest number shown in FIG. 1).

Indeed, in our system we have discovered that for raster displays of the 400 pixels per inch variety, a line profile following a gaussian curve and contributing light intensity to between seven and nine pixels is quite satisfactory. Of course, a different filter shape and a different distance between pixels would yield a different number of affected pixels.

In accordance with our invention, once a profile curve is selected, a line profile dependsd primarily on line thickness, on the distance between pixels, on the number of bits devoted to defining the intensity of each pixel, on the orientation of the line (its slope), and on the location of the line (the distance of its centerline from the nearest pixel). Further in accordance with our invention, we deal with line slopes, thicknesses, and centerline position in a discrete manner; recognizing only a fixed number of those variables. The specific number of thickness, slope, and position values is, however, relatively unimportant because the product of their numbers is the number of potentially different line profiles. That number can be selected to match the size of the memory that one wishes to employ. In our embodiments we divided the horizontal distance between pixels into eight segments, with very good results. It may be noted in passing that the distance between pixels in the horizontal direction and in the vertical direction does not have to be the same.

The distance between pixels for a particular display terminal is known, and line thickness is either known or is easily determined. Line position between pixels can be determined with relative ease (particularly if the specificaion of the line to be drawn is derived from an equation), but an accurate determination of the slope of the line is not as easy. What we do, however, is to approximate the slope of the line in the neighborhood of a particular cut (e.g. along a scan line, such as cut BB in FIG. 1) from the line position at the cut under consideration and the line position at an adjacent cut (line "position" at a cut refers to the point at the center of the line, such as point X in FIG. 1. That is, whether a line to be drawn is derived from an equation or from some other source, successive points of the line $n_1$, $n_2$, etc. as it appears on screen 120 are computed and the locations so computed are assigned an intensity corresponding to the desired intensity of the line. Those intensities are conventionally stored in screen memory 10 (in corresponding screen memory locations), and it is these points that we use to approximate the slope of the line in the neighborhood of a particular cut. In FIG. 1, for example, if it is assumed that the line is straight and it is known how many pixel distances (m) they are apart. With almost equal accuracy one can assume that a and b approximate the slope of the line at a and thus, the values of a, b and m may be used to appropriately address the memory locations that contain the line profiles (different thicknesses) for position a with a slope defined by a, b, and m.

Although there is no absolute requirement that the line profile be symmetric, in a number of our embodiments we have used the gaussian filter $e^{-x^2/2\sigma^2}$. We found that the value of sigma can be chosen to be 0.55 with good results at all line orientations, yielding a profile spread of nine pixels. Use of a symmetric line profile provides an advantage in that the number of different profiles is only half the number of different positions (between adjacent pixels) that are recognized. The other half is a mirror image of the first half and need not be stored if memory capacity is a problem. Similarly, when considering line slopes, it is only the first 45 degree interval that is unique. The uniqueness of the first 45 degrees has a broader implication, however.

Figure 3:
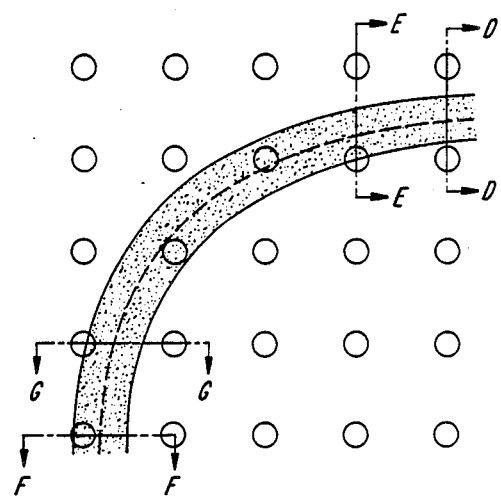
FIG. 3 illustrates a curved line with horizontal and vertical cuts.

Viewing FIG. 3, it is quite apparent that the line slopes at cuts DD and FF are similar, and cuts at EE and GG are similar, when the relationship of the x and y axes is reversed. Furthermore, we discovered that it simplifies the method and apparatus of our invention to not merely develop slopes for large angles from slopes of small angles, but to actually employ vertical painting in some cases and horizontal painting in other cases. As depicted in FIG. 3, the same line profile that permits painting cut FF vertically can be used to paint cut DD horizontally. The double benefit to this is that the look-up table which contains the line profile information is smaller, and that the number of pixels that must be painted for each cut is smaller. Both reduce the size of the required memory but the latter also speeds up the processing.

A perusal of FIG. 3 reveals a potential difficulty, however. Although it is clear where it is advantageous to paint with horizontal profiles and where it is advantageous to paint with vertical profiles, it is not at all clear where and how to make the transition from one mode to the other. One approach is to compare the angle representing the current slope of the line $\theta$ to the angle computed in the previous iteration (previous scan) $\theta 1$. The algorithm that may be employed in connection with this comparison is the following: if horizontal painting is used, switch mode only if $\theta < \theta 1 < 45$. If vertical painting is used, switch mode only if $\theta > \theta 1 > 45$.

In light of the above detailed description, it behooves the practitioner of our invention to create a profiles look-up table that is keyed to the parameters a, b, and m. The contenst of the look-up memory are precomputed in accordance with the desired profile function and permanently stored in the memory. That is, one can think of the table as one that has the four column a, b, m, and $h_L(x)$, where L stands for the combination of a, b, and m; but conventionally, the lookup table stores only the value of $h_L(x)$ in addresses that correspond to the binary word that is formed by concatenating a b and m.

The values of $h_L(x)$ are computed in accordance with the selected profile. Thus, for the above-described gaussian profile, $h_L(x)=e^{-x^2/2\sigma^2}$ L is computed to whatever granularity b is assigned (b being the fractional distance between the center of the line and the center of the nearest pixel), where x is the pixel number away from the pixel that is nearest to the center of the line as can have the range, for example, of ±4. A line is painted in the manner described herein by modifying the contents of the screen memory associated with the display of the terminal and letting the normal scanning of the screen memory present the painted line on the screen.

Having computed the table with a portion of the line drawn up to a particular scan line, i.e. the calculations performed to define the value of dx2, the method of our invention proceeds in the following steps:

(a) Compute a, and m and angle $\theta$ at the next scan line.

Figure 4:
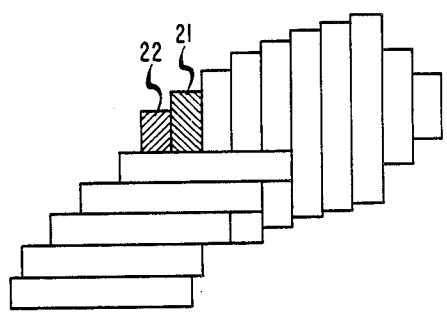
FIG. 4 shows the brush strokes employed for the FIG. 3 line.

(b) Obtain the appropriate array, $h_L(x)$ from the table. Since the table only gives normalized values, multiply the table entries by the intensity of the line drawn (c) If $\theta$ indicates a need to switch the painting mode, introduce a correction. The correction is needed because when the direction of painting is changed, some pixels which should be painted (because they are sufficiently close to the drawn-line) would not get painted. This is shown in FIG. 4 by shaded areas 21 and 22. To correct this, the previous mode is continued for two additional cross-cuts on the extended drawn-line: one with the pixel-array values attenuated to 75% of the desired intensity, and the other with pixel array values attenuated to 25% of the desired intensity. This yields a subjectively pleasing result that is free of any noticeable artifacts.

(d) If the drawn-line either ends or switches direction abruptly (as in piecewise straight lines connecting a set of given points), introduce a correction as above, extending the previous segment of the drawn-line is extended for two cross-sections, as shown in FIG. 4. By attentuating the intensity as in (c) above, the effect of two-dimensional filters is simulated, and end points as well as corners appear proper.

(e) Having obtained the appropriate array of pixel intensities, $h_L(x)$ the drawn line is painted and "blended" with the background of the display. This is accomplished by creating a "blended" intensity I(x) at point x in accordance with the equation below:

$$I(x)=I_b(x)+(I_f-I_b(x))\,h_L(x)$$

where $I_f$ is the desired intensity of the drawn line, $I_b(x)$ is the background intensity at point x, and $h_L(x)$ is obtained from the table as described in previous steps. It is understood, of course, that the above painting and blending operations contemplate the conventional implementation of imaging on a raster scan terminal, where there exists a screen memory that contains the pixel intensity specifications for the screen and the display terminal repeatedly scans through the screen memory and displays the appropriate intensities on the terminal. The painting and blending is achieved by placing in the screen memory the above-described intensity values.

Figure 5:
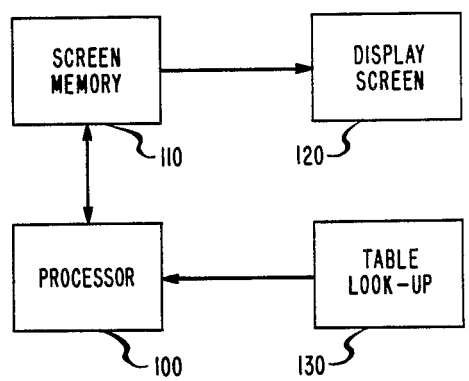
FIG. 5 presents a block diagram of a system for carrying out the principles of our invention.

FIG. 5 depicts a simple hardware implementation for carrying out the method of our invention. We contemplate that, most advantageously, our method will be carried out in a general purpose computer, such as the AT&T 6300 PC, and in such a circumstance processor 100 which communicates with screen memory 110 that feeds information to display screen 120 are part of the standard PC hardware. Table look-up 130 is the special purpose element which, in combination with the other elements, produces the unique and desirable results of our invention. Table look-up 130 may be a read only memory device that contains the precomputed profile values.

The above description of our method and apparatus is presented to illustrate the principles of our invention. Numerous variations can of course be incorporated, such as different constants or a different profile function, without departing from the principles of our invention.

What is claimed is:

1. A method for drawing a line on a raster scan terminal which creates images with a plurality of scans, where each scan includes a plurality of pixels and the collection of pixels from said scans stored in a screen memory, forms a regular array of pixels, comprising the steps of:

computing position of successive points $n_1, n_2, n_3, \ldots n_i$ of said line;

evaluating position of each of said successive point, $n_j$ with respect to the immediately predeing point, $n_{j-1}$ by developing a signal representative of the distance from $n_j$ to the nearest pixel in the scan containing $n_j$ and a signal representative of the number of pixels separating said nearest pixel of $n_j$ from a corresponding nearest pixel of $n_{j-1}$;

selecting a painting profile from said position of point $n_j$ with respect to said position of point $n_{j-1}$ from a precomputed set of profiles;

selecting a horizontal mode of painting or a vertical mode of painting of said profile, based on said position of point $n_j$ with respect to said position of point $n_{j-1}$; and applying said profile to said screen memory, in accordance with said step of selecting mode of painting, to modify intensity information stored in said screen memory.

2. The method of claim 1 wherein said step of evaluating position of a point includes restricting said evaluating to preselected positions in the distance between pixels in said array of pixels.

3. The method of claim 2 wherein the number of said preselected positions is binary.

4. The method of claim 1 wherein said step of evaluating position of a point includes evaluating a slope of said line in the neighborhood of said point.

5. The method of claim 1 wherein said step of evaluating position of a point includes evaluating an angle of said line away from the vertical axis in the neighborhood of said point.

6. The method of claim 5 wherein said step of selecting mode includes determining whether horizontal painting or vertical painting is to be employed based on the value of said angle.

7. The method of claim 6 wherein horizontal painting mode is selected when the value of said angle is less than 45 degrees, and vertical painting mode is selected when the value of said angle is greater than 45 degrees.

8. The method of claim 6 wherein said step of selecting mode includes a step of correction that is activated when said angle is in the neighborhood of 45 degrees.

9. Method of claim 8 wherein said step of correction employs both horizontal and vertical painting modes applied to paint at least one of said points.

10. The method of claim 1 wherein said step of applying said profile to said terminal includes blending said profile within said image.

11. The method of claim 10 wherein said blending is accomplished by developing intensity values in accordance with the equation $$I(x) = I_b(x) + (I_f - I_b(x))h_L(x)$$

where $I_f$ is the desired intensity of the said line, $I_b(x)$ is the background intensity at point x on said terminal, and $h_L(x)$ is obtained from said step of determining a painting profile.

12. The method of claim 1 wherein said successive points $n_1, n_2, n_3, \ldots n_i$ lie on successive ones of said scans.

13. A system for drawing a line responsive to an input stimulus on a raster scan terminal which creates images with a plurality of scans, where each scan includes a plurality of pixels and the collection of pixels from said scans stores in a screen memory, forms a regular array of pixels, comprising:

first means for computing position of successive points $n_1, n_2, n_3, \ldots n_i$ of said line;

second means, responsive to said first means, for evaluating position of each of said successive point, $n_j$ with respect to the immediately preceding point, $n_{j-1}$ by developing a signal representative of the distance from $n_j$ to the nearest pixel in the scan containing $n_j$ and a signal representative of the number of pixels separating said nearest pixel of $n_j$ from a corresponding nearest pixel of $n_{j-1}$;

third means, responsive to said second means, for selecting a painting profile from said position of point $n_j$ with respect to said position of point $n_{j-1}$ from a precomputed set of profiles;

fourth means, responsive to said third means, for selecting a horizontal mode of painting or a vertical mode of painting of said profile, based on said position of point $n_j$ with respect to said position of point $n_{j-1}$; and fifth means, responsive to said fourth means, for applying said profile to said screen memory.

* * * * *